(12) United States Patent
Wang et al.

(10) Patent No.: US 7,639,323 B2
(45) Date of Patent: Dec. 29, 2009

(54) LIQUID CRYSTAL DISPLAY

(75) Inventors: Chun-Chieh Wang, Hsinchu (TW); Yu-Hui Chou, Hsinchu (TW); Ya-Ling Hsu, Hsinchu (TW); Chun-Liang Lin, Hsinchu (TW); Chen-Hsien Liao, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 129 days.

(21) Appl. No.: 12/040,924

(22) Filed: Mar. 3, 2008

(65) Prior Publication Data

US 2008/0266491 A1  Oct. 30, 2008

(30) Foreign Application Priority Data

Dec. 6, 2007  (TW) .............................. 96146584 A

(51) Int. Cl.
*G02F 1/1335* (2006.01)
(52) U.S. Cl. ..................... 349/106; 349/107; 349/108
(58) Field of Classification Search ......... 349/106–108
See application file for complete search history.

(56) References Cited

U.S. PATENT DOCUMENTS 7,126,274 B2  10/2006  Shimizu et al.
2006/0227260 A1  10/2006  Haga et al.

*Primary Examiner*—David Nelms
*Assistant Examiner*—Phu Vu
(74) *Attorney, Agent, or Firm*—Jianq Chyun IP Office

(57) ABSTRACT

A liquid crystal display (LCD) including a backlight module and a liquid crystal display panel is provided. The backlight module has at least one white light source. $BL_1$ and $BL_2$ respectively represent maximum brightness peaks of a normalized emission spectrum of the backlight module at a wavelength between 500 nm to 520 nm and between 445 nm to 465 nm, in which $0.91 \leq BL_1/BL_2 \leq 0.99$. The liquid crystal display panel is disposed above the backlight module, and has a plurality of substrates and one liquid crystal layer located between them. One of substrates has a red filter layer, a green filter layer, and a blue filter layer, and the coordinate values of the red filter layer, the green filter layer, and the blue filter layer in CIE 1931 chromaticity diagram satisfy predetermined relation expressions.

18 Claims, 5 Drawing Sheets

LIQUID CRYSTAL DISPLAY

CROSS-REFERENCE TO RELATED APPLICATION

This application claims the priority benefit of Taiwan application serial no. 96146584, filed on Dec. 6, 2007. The entirety the above-mentioned patent application is hereby incorporated by reference herein and made a part of specification.

BACKGROUND OF THE INVENTION

1. Field of the Invention

The present invention generally relates to a display, in particular, to a liquid crystal display (LCD).

2. Description of Related Art

Thanks to the advantages of high definition, desirable space utilization efficiency, low power consumption, and no radiation etc., the LCD has gradually become the main stream of the displays. As the prevailing of the LCD, one of the important indexes to be considered by the consumer when purchasing the LCD is high color reproduction. Recently, in order to meet the consumers' requirements, various LCDs adopting the high color reproduction technique have successively appeared on the market.

The LCD is mainly constituted by a liquid crystal display panel and a backlight module for providing a light source for the liquid crystal display panel, in which the liquid crystal display panel includes, for example, an active device array substrate, a color filter, and a liquid crystal layer sandwiched there between. Generally, the light source in the backlight module may adopt a cold-cathode fluorescent lamp (CCFL), a light emitting diode (LED), or other types of light sources. Taking the CCFL as the white light source in the backlight module for example, currently, the color saturation NTSC ratio of the LCD approximately reaches a level from 70% to 75%, in which the color saturation NTSC ratio is used to evaluate the color saturation according to the standard issued by National Television System Committee (NTSC).

FIG. 1A is variation diagram of chromaticity coordinates when the high color reproduction technique of the LCD is developed according to the conventional art. Referring to FIG. 1A, through changing the type of the fluorescent powder in the CCFL, for example, changing the green fluorescent powder with an intensity peak between 540 nm and 550 nm to the green fluorescent powder with an intensity peak between 510 nm and 520 nm, the color saturation of the LCD after the adjustment is improved. However, on the other hand, the color temperature shift of the white point for the LCD occurs after adjustment, such that the color representation of the LCD is distorted.

In order to solve the above problems, as shown in FIG. 1B, it is a variation diagram of chromaticity coordinates when the high color reproduction technique of the LCD is developed according to another conventional art. Through adjusting the ratio of red fluorescent powder, green fluorescent powder, and blue fluorescent powder in the CCFL, the white point color temperature of the LCD after the adjustment is improved, but on the other hand, the color saturation is sacrificed.

To sum up, it has become an important issue in the high color reproduction technique how to improve the color saturation while considering the white point color temperature representation of the LCD.

SUMMARY OF THE INVENTION

Accordingly, the present invention is directed to an LCD capable of improving the color saturation while considering the white point color temperature representation of the LCD.

The present invention provides an LCD, which includes a backlight module and a liquid crystal display panel. The backlight module has at least one white light source. $BL_1$ and $BL_2$ respectively represent maximum brightness peaks of a normalized emission spectrum of the backlight module at a wavelength between 500 nm and 520 nm and between 445 nm and 465 nm, in which $0.91 \leq BL_1/BL_2 \leq 0.99$. The liquid crystal display panel is disposed above the backlight module and has a plurality of substrates and a liquid crystal layer located between the substrates. One of the substrates has a red filter layer, a green filter layer, and a blue filter layer, and the red filter layer, the green filter layer, and the blue filter layer satisfy the following relation expressions:

(1) $R_x \geq 0.655$, (2) $G_x \geq 0.275$, and (3) $B_y \geq 0.075$, in which $R_x$ is defined as x coordinate value of the red filter layer in CIE 1931 chromaticity coordinate diagram under a C light source, $G_x$ is defined as x coordinate value of the green filter layer on CIE 1931 chromaticity coordinate diagram under the C light source, and $B_y$ is defined as y coordinate value of the blue filter layer on CIE 1931 chromaticity coordinate diagram under the C light source.

The present invention further provides an LCD, which includes a backlight module and a liquid crystal display panel. The backlight module has at least one white light source. $BL_1$ and $BL_2$ respectively represent maximum brightness peaks of the normalized emission spectrum of the backlight module at a wavelength between 500 nm and 520 nm and between 445 nm and 465 nm, and $BL_1/BL_2 \geq 0.65$. The liquid crystal display panel is disposed above the backlight module and has a plurality of substrates and a liquid crystal layer located between the substrates, in which one of the substrates has a red filter layer, a green filter layer, and a blue filter layer, and the red filter layer, the green filter layer, and the blue filter layer satisfy the following relation expressions:

(1) $R_x \geq 0.655$, (2) $G_x \geq 0.275$, and (3) $B_y \geq 0.075$, in which $R_x$ is defined as x coordinate value of the red filter layer in CIE 1931 chromaticity coordinate diagram under a C light source, $G_x$ is defined as x coordinate value of the green filter layer in CIE 1931 chromaticity coordinate diagram under the C light source, and $B_y$ is defined as y coordinate value of the blue filter layer in CIE 1931 chromaticity coordinate diagram under the C light source.

According to an embodiment of the present invention, the backlight module includes a direct-type backlight module or an edge-type backlight module.

According to an embodiment of the present invention, the white light source includes a white LED.

According to an embodiment of the present invention, the white light source includes a CCFL, in which the CCFL has various fluorescent powder materials on an inner wall, and the fluorescent powder material includes red fluorescent powder, green fluorescent powder material, and blue fluorescent powder.

According to an embodiment of the present invention, the substrate includes a thin film transistor (TFT) array substrate and a color filter substrate. In another embodiment, the two substrates include a color filter on array (COA) substrate and an opposite substrate having a common electrode. In still another embodiment, the two substrates include an array on color filter (AOC) substrate and an opposite substrate having a common electrode.

To sum up, in the LCD of the present invention, through controlling the main brightness peak distribution of the normalized emission spectrum of the backlight module, and meanwhile appropriately using corresponding color filter layer, it is taken as a determination standard for adjusting the color representation of the LCD. In other words, through defining the emission spectrum of the backlight module and enabling the chromaticity coordinates of each color filter layer to satisfy the specific relation, both the color saturation and the white point color temperature can be considered for the color representation of the LCD.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
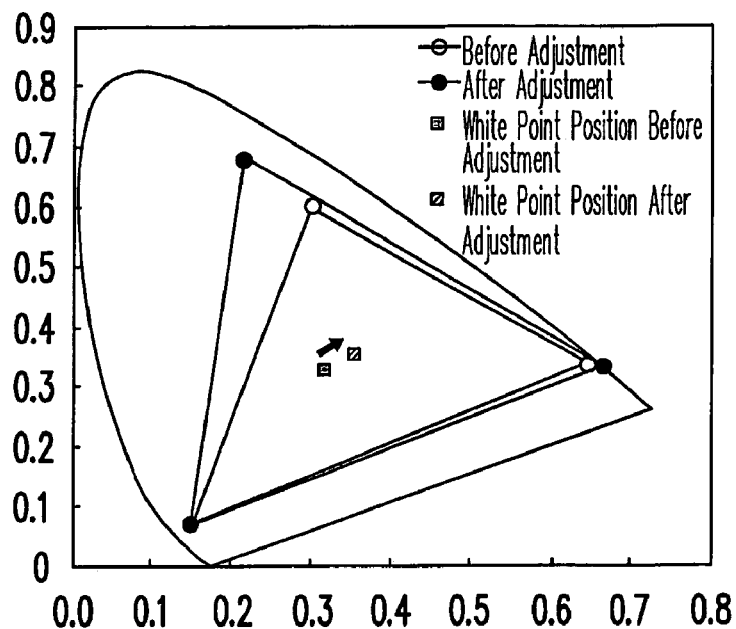
FIG. 1A is variation diagram of chromaticity coordinates when the high color reproduction technique of the LCD is developed according to the conventional art.
Figure 1B:
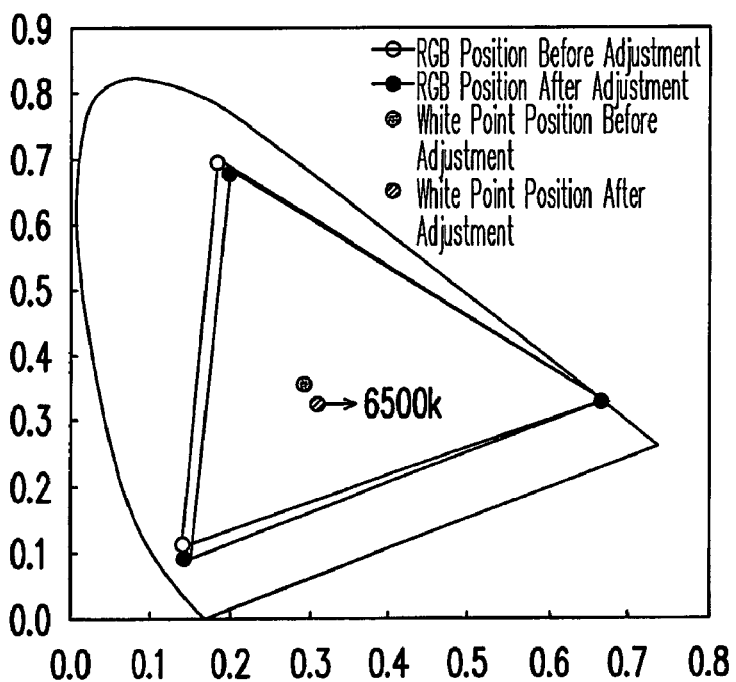
FIG. 1B is a variation diagram of chromaticity coordinates when the high color reproduction technique of the LCD is developed according to another conventional art.

Reference will now be made in detail to the present embodiments of the invention, examples of which are illustrated in the accompanying drawings. Wherever possible, the same reference numbers are used in the drawings and the description to refer to the same or like parts.

First Embodiment

Figure 2:
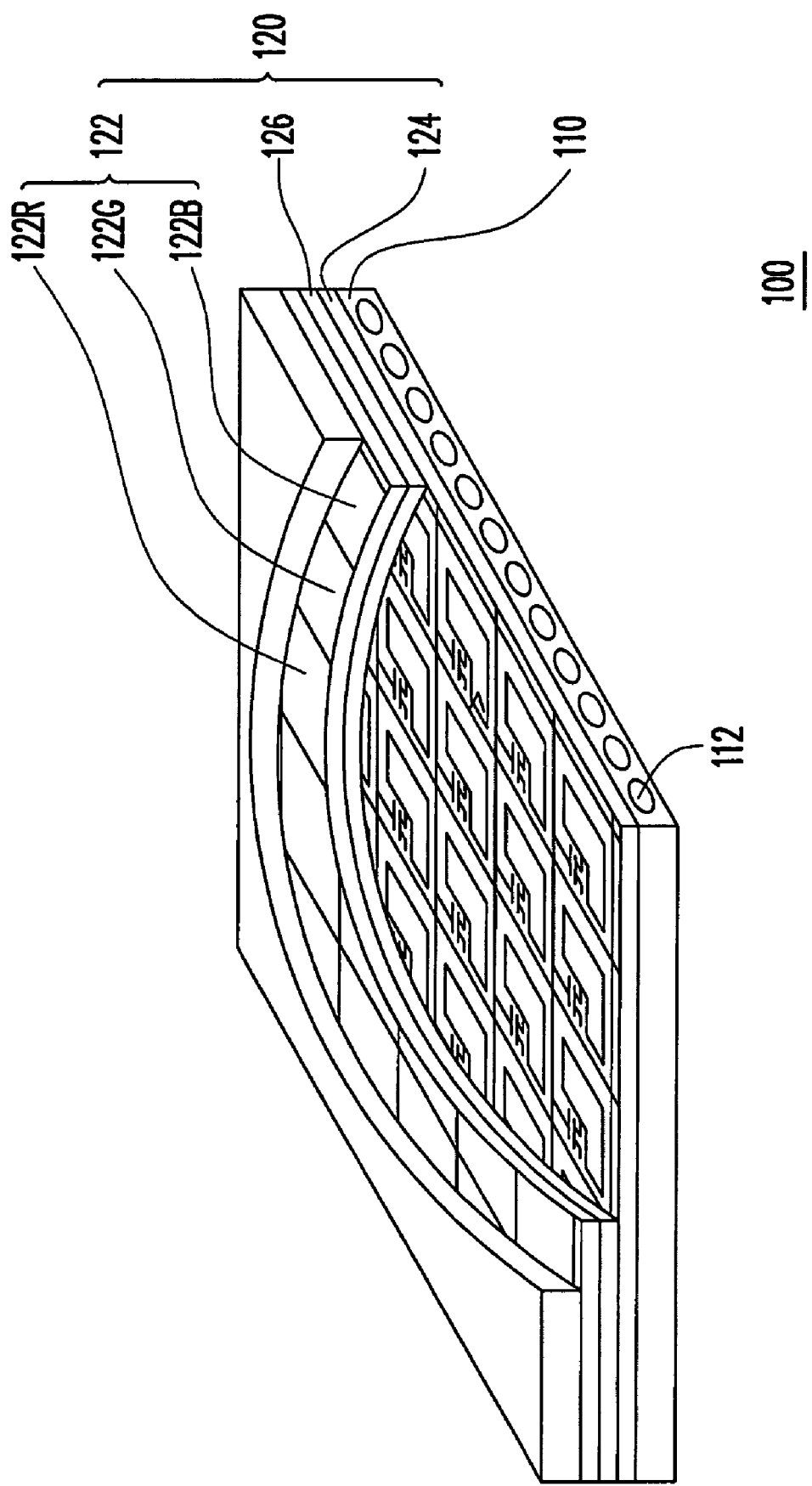
FIG. 2 is a schematic view of an LCD according to a first embodiment of the present invention.

FIG. 2 is a schematic view of an LCD according to a first embodiment of the present invention. Referring to FIG. 2, an LCD 100 includes a backlight module 110 and a liquid crystal display panel 120, in which the backlight module 110 is, for example, a direct-type backlight module or an edge-type backlight module. The backlight module 110 has at least one white light source 112. Light beams from the white light source 112 pass through an optical film and then emitted from the backlight module 110 towards the liquid crystal display panel. After a procedure of normalizing the emission spectrum, as for the light beams emitted from the backlight module, $BL_1$ is defined as the maximum brightness peak at a wavelength between 500 nm and 520 nm, and $BL_2$ is defined as the maximum brightness peak at a wavelength between 445 nm and 465 nm, in which the process for normalizing the emission spectrum is, for example, to set the maximum brightness peak in the emission spectrum as 1.0. In addition, in this embodiment, the white light source 112 is, for example, a CCFL, in which the CCFL has various fluorescent powder materials on an inner wall, for example, red fluorescent powder, green fluorescent powder, and blue fluorescent powder, for adjusting the brightness, chromaticity, and other optical properties of the white light source. In other embodiments, the white light source 112 may also be a white LED.

Referring to FIG. 2, the liquid crystal display panel 120 is disposed above the backlight module 110 and has two substrates and a liquid crystal layer 126 sandwiched between the two substrates. As shown in FIG. 2, the two substrates may be a TFT array substrate 124 and a color filter substrate 122, in which the color filter substrate 122 has a red filter layer 122R, a green filter layer 122G, and a blue filter layer 122B. Definitely, in other embodiments, the two substrates may also be a COA substrate and an opposite substrate having a common electrode, or may be an AOC substrate and an opposite substrate having a common electrode. Particularly, when the red filter layer 122R, the green filter layer 122G, and the blue filter layer 122B are measured according to the standard illuminant (C light source) made by International Commission on Illumination (CIE), the red filter layer 122R, the green filter layer 122G, and the blue filter layer 122B satisfy the following relation expressions:

$$R_x \geq 0.655, \quad (1)$$

$$G_x \geq 0.275, \text{ and} \quad (2)$$

$$B_y \leq 0.075, \quad (3)$$

in which $R_x$ is defined as x coordinate value of the red filter layer 122R in CIE 1931 chromaticity coordinate diagram under a C light source, $G_x$ is defined as x coordinate value of the green filter layer 122G in CIE 1931 chromaticity coordinate diagram under the C light source, and $B_y$ is defined as y coordinate value of the blue filter layer 122B in CIE 1931 chromaticity coordinate diagram under the C light source.

Figure 3A:
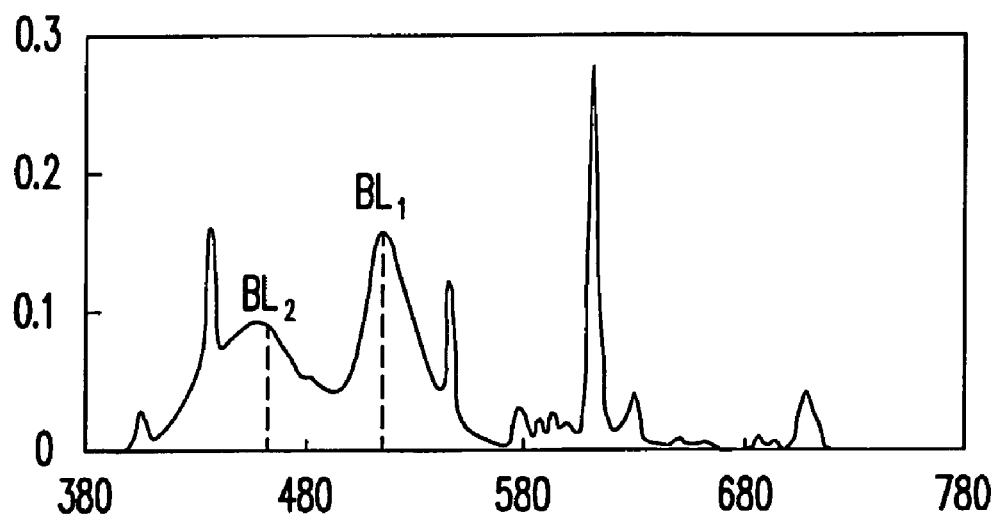
FIG. 3A is a schematic view of a normalized emission spectrum of a backlight module according to the present invention.

FIG. 3A is a schematic view of a normalized emission spectrum of a backlight module according to the present invention. Referring to FIG. 3A, $BL_1$ and $BL_2$ respectively represent maximum brightness peaks of the normalized emission spectrum of the backlight module 110 at a wavelength between 500 nm and 520 nm and between 445 nm and 465 nm. It should be noted that, in this embodiment, the emission spectrum of the backlight module 110 satisfies the relation expression of $0.91 \leq BL_1/BL_2 \leq 0.99$, and the red filter layer 122R, the green filter layer 122G, and the blue filter layer 122B in the liquid crystal display panel 120 also satisfy the following relation expressions: (1) $R_x \geq 0.655$, (2) $G_x \geq 0.275$, and (3) $B_y \leq 0.075$. Particularly, when the backlight module 110 and the liquid crystal display panel 120 satisfying the above specific relation expressions are matched together, the white point color temperature of the LCD 100 is substantially maintained at 6500 K, and the color saturation NTSC ratio reaches a level from 92% to 95%. Some data are listed below for demostrating the color representation of the LCD.

TABLE 1

| LCD | Backlight Module | | | Chromaticity Coordinate Value | |
|---|---|---|---|---|---|
| Type | $BL_1$ | $BL_2$ | $BL_1/BL_2$ | Wx | Wy |
| A | 0.336 | 0.340 | 0.987 | 0.305 | 0.324 |
| B | 0.307 | 0.331 | 0.928 | 0.303 | 0.325 |
| C | 0.306 | 0.329 | 0.928 | 0.304 | 0.324 |
| D | 0.307 | 0.333 | 0.922 | 0.301 | 0.320 |
| E | 0.304 | 0.329 | 0.925 | 0.301 | 0.318 |

Particularly, Table 1 lists some actually measured data about the chromaticity coordinates of the LCD 100 in this embodiment. Referring to Table 1, the LCDs A, B, C, D, and E respectively use backlight modules with different emission spectrums, in which each backlight module 110 corresponds to different $BL_1$ and $BL_2$ values. Next, after the backlight modules are matched with the liquid crystal display panel 120 satisfying the above specific relation, the chromaticity coordinates data of the LCDs A, B, C, D, and E are respectively measured, and Wx and Wy respectively represent x coordinate value and y coordinate value of the white point for the LCD 100 in the CIE 1931 chromaticity coordinate diagram. Those of ordinary skill in the field of the present invention can perform mutual conversion between the chromaticity coordinate values of Wx and Wy and the white point color temperature. For example, when a white point color temperature 6500 K is converted into the chromaticity coordinate values, central values of Wx and Wy are substantially 0.131 and 0.329. Actually, if a designer controls the values of Wx and Wy respectively within the scope of Wx±0.015 and Wy±0.015, the white point color temperature displayed by the LCD 100 substantially falls between 5600 K and 7500 K. Generally, the scope for controlling the white point color temperature is also the design object for a part of application products of the LCD 100.

Figure 3B:
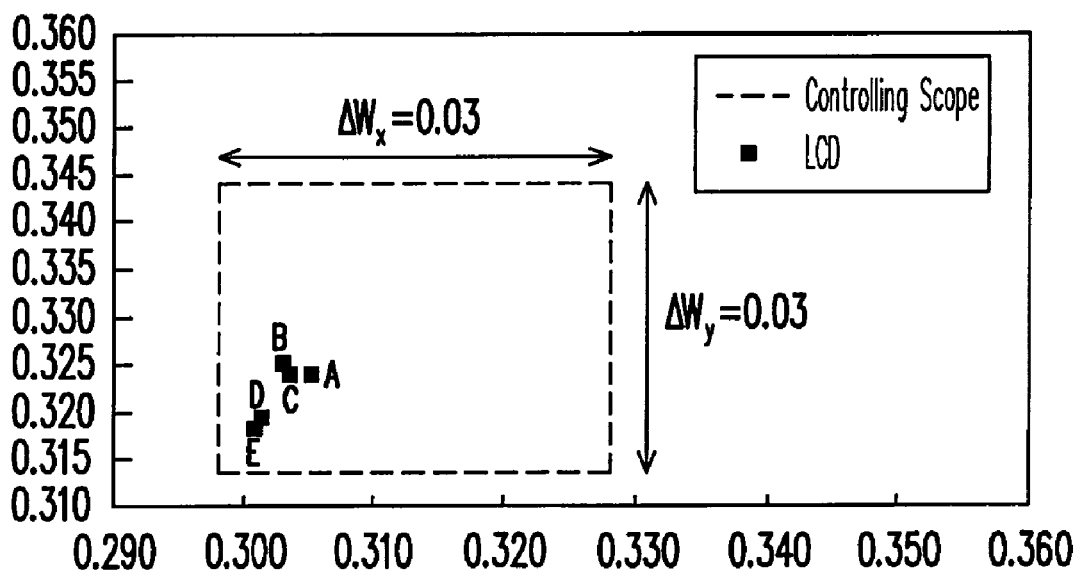
FIG. 3B is a diagram of some actually measured CIE 1931 chromaticity coordinates of the LCD according to the first embodiment of the present invention.

FIG. 3B shows a CIE 1931 chromaticity coordinate diagram of each LCD in Table 1. Referring to Table 1 and FIG. 3B, the chromaticity coordinate values (Wx, Wy) of the LCDs A, B, C, D, and E all fall within a scope of (0.313±0.015, 0.329±0.015). In other words, when the emission spectrum of the backlight module 110 satisfies $0.91 \leq BL_1/BL_2 \leq 0.99$, and the red filter layer 122R, the green filter layer 122G, and the blue filter layer 122B of the liquid crystal display panel 120 satisfy the following relation expressions: (1) $R_x \geq 0.655$, (2) $G_x \geq 0.275$, and (3) $B_y \leq 0.075$, the LCD 100 has an excellent color representation, the white point color temperature thereof is substantially 6500 K, and the color saturation NTSC ratio reaches the level from 92% to 95%. Therefore, as for the products requiring the white point color temperature of about 6500 K, for example, desktop liquid crystal screen, this embodiment can provide the color representation determination standard for the LCD when the high color reproduction technique is developed, so that both the color saturation and the white point color temperature can be considered for the color representation of the LCD.

Second Embodiment

Figure 4:
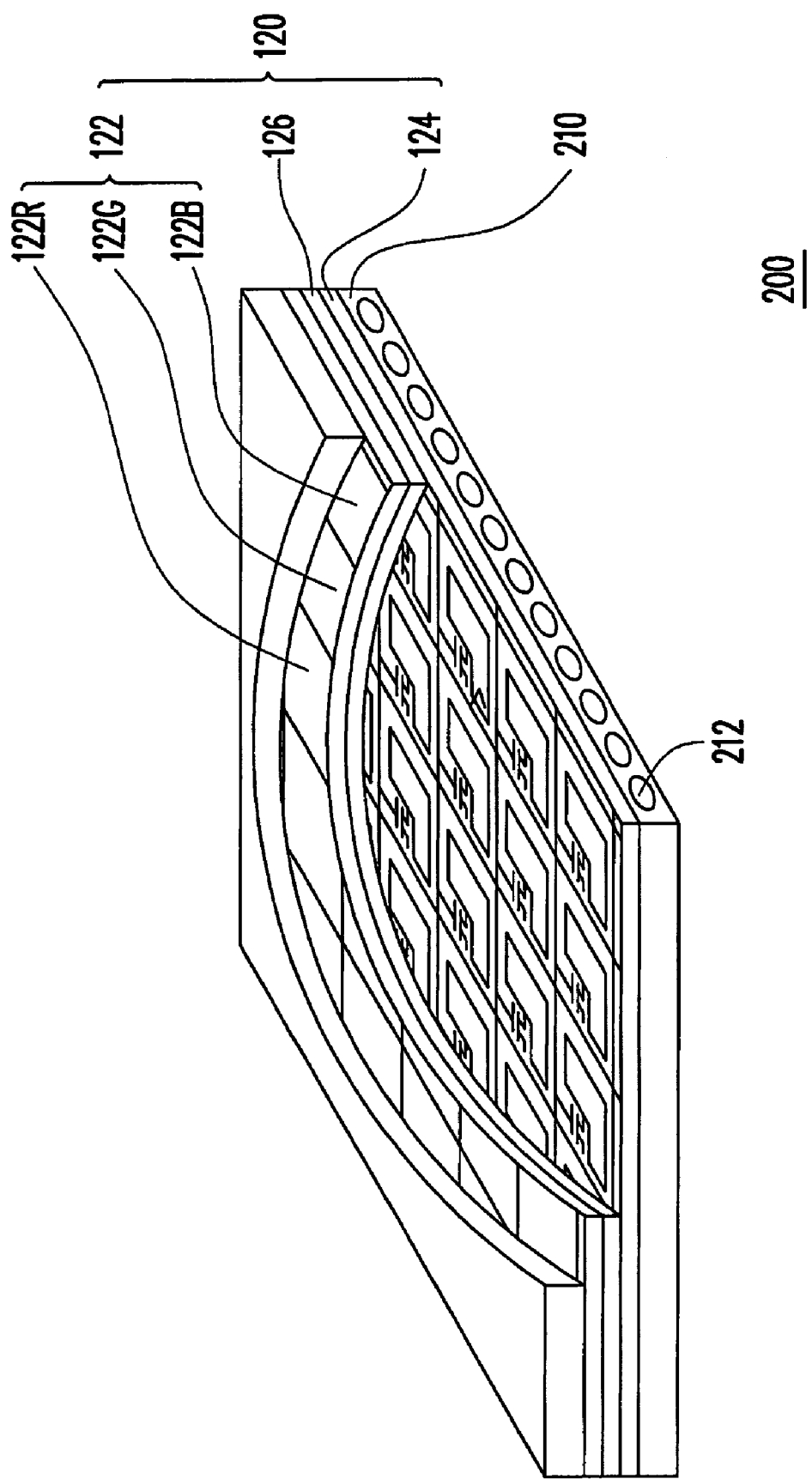
FIG. 4 is a schematic view of another LCD according to the present invention.

As for some other application products of the LCD, the designing object of the white point color temperature is substantially 10000 K, for example, liquid crystal televisions. Therefore, the present invention further provides an LCD 200. FIG. 4 is a schematic view of another LCD according to the present invention. Referring to FIG. 4, the LCD 200 includes a backlight module 210 and a liquid crystal display panel 120. The LCD 200 of this embodiment is similar to the LCD 100 of FIG. 2, except for the emission spectrum of the backlight module 210. In this embodiment, the backlight module 210 has at least one white light source 212. $BL_1$ and $BL_2$ respectively represent maximum brightness peaks of the normalized emission spectrum of the backlight module 210 at a wavelength between 500 nm and 520 nm and between 445 nm and 465 nm, and $BL_1/BL_2 \leq 0.65$. The other components are similar to that of the first embodiment, which thus will not be described herein.

It should be noted that, in this embodiment, the emission spectrum of the backlight module 210 satisfies the relation expression of $BL_1/BL_2 \leq 0.65$, and the red filter layer 122R, the green filter layer 122G, and the blue filter layer 122B in the liquid crystal display panel 120 satisfy the following relation expressions: (1) $R_x \geq 0.655$, (2) $G_x \geq 0.275$, and (3) $B_y \leq 0.075$. When the backlight module 210 is matched with the liquid crystal display panel 220 satisfying the above specific relation expressions, the white point color temperature of the LCD 200 is substaintially 10000 K, and the color saturation NTSC ratio substantially reaches a level from 92% to 95%.

Table 2 lists some actually measured data about the chromaticity coordinates of the LCD in this embodiment. Referring to Table 2, the LCDs F and G respectively use backlight modules 210 with different emission spectrums, in which each backlight module 210 corresponds to different $BL_1$ and $BL_2$ values. Next, when the backlight modules 210 is matched with the liquid crystal display panel 120 satisfying the above specific relation, the chromaticity coordinate values of the LCDs F and G are respectively measured. Particularly, after the white point color temperature 10000 K is converted into the chromaticity coordinate values, the central values of Wx and Wy are substantially 0.28 and 0.29. Actually, the designer generally controls the designed target values of (Wx, Wy) respectively in the scope of (0.28±0.015, 0.29±0.015).

TABLE 2

| LCD | Backlight Module | | | Chromaticity Coordinate Value | |
|---|---|---|---|---|---|
| Type | $BL_1$ | $BL_2$ | $BL_1/BL_2$ | Wx | Wy |
| F | 0.172 | 0.268 | 0.643 | 0.278 | 0.279 |
| G | 0.186 | 0.287 | 0.650 | 0.289 | 0.284 |

Figure 5:
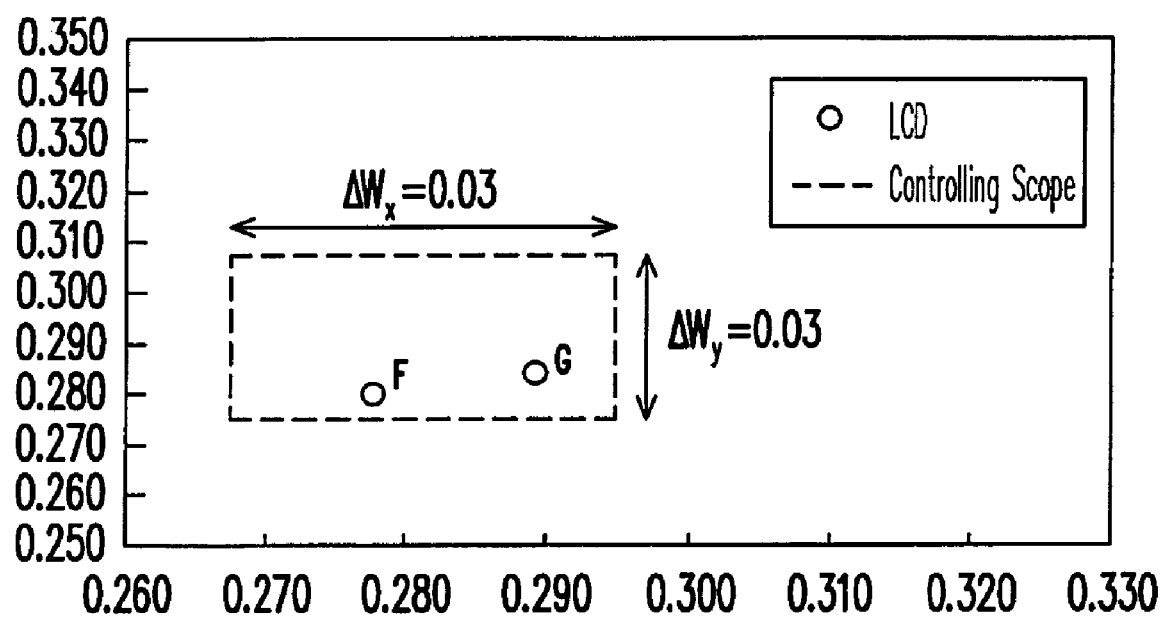
FIG. 5 is a diagram of some actually measured CIE 1931 chromaticity coordinates of an LCD according to a second embodiment of the present invention.

FIG. 5 shows a CIE 1931 chromaticity coordinate diagram of each LCD in Table 2. Referring to Table 2 and FIG. 5, the chromaticity coordinate values of the LCDs F and G all fall within the scope of (0.28±0.015, 0.29±0.015). In other words, when the emission spectrum of the backlight module 210 satisfies $BL_1/BL_2 \leq 0.65$, and the red filter layer 122R, the green filter layer 122G, and the blue filter layer 122B of the liquid crystal display panel 120 satisfy the following relation expressions: (1) $R_x \geq 0.655$, (2) $G_x \geq 0.275$, and (3) $B_y \leq 0.075$, the LCD 200 has an excellent color representation, the white point color temperature is substantially 10000 K, and the color saturation NTSC ratio reaches a level from 92% to 95%. Therefore, in a part of the applications of the LCD 200, as for the products requiring the white point color temperature of about 10000 K, for example, the liquid crystal televisions, this embodiment can provide the color representation determination standard for the LCD when the high color reproduction technique is developed, so that both the color saturation and the white point color temperature can be considered for the color representation of the LCD.

To sum up, in the LCD of the present invention, through controlling the emission spectrum of the backlight module, and meanwhile appropriately matching with corresponding color filter layer, the present invention can be taken as a determination standard for the color representation of the LCD. In other words, through defining the emission spectrum of the backlight module and enabling the chromaticity coordinates of corresponding color filter layer to satisfy the specific relation, both the color saturation and the white point color temperature can be considered for the color representation of the LCD.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A liquid crystal display (LCD), comprising:
   a backlight module having at least one white light source, wherein $BL_1$ and $BL_2$ respectively represent maximum brightness peaks of a normalized emission spectrum of the backlight module at a wavelength between 500 nm and 520 nm and between 445 nm and 465 nm, and $0.91 \leq BL_1/BL_2 \leq 0.99$;
   a liquid crystal display panel disposed above the backlight module and having a plurality of substrates and a liquid crystal layer located between the substrates, wherein one of the substrates has a red filter layer, a green filter layer, and a blue filter layer, and the red filter layer, the green filter layer, and the blue filter layer satisfy the following relation expressions:

$R_x \geq 0.655$, $G_x \geq 0.275$, $B_y \leq 0.075$, wherein $R_x$ is defined as x coordinate value of the red filter layer in CIE 1931 chromaticity coordinate diagram under a C light source, $G_x$ is defined as x coordinate value of the green filter layer in CIE 1931 chromaticity coordinate diagram under the C light source, and $B_y$ is defined as y coordinate value of the blue filter layer in CIE 1931 chromaticity coordinate diagram under the C light source.

2. The LCD according to claim 1, wherein the backlight module comprises a direct-type backlight module or an edge-type backlight module.

3. The LCD according to claim 1, wherein the white light source is a white light emitting diode (LED).

4. The LCD according to claim 1, wherein the white light source is a cold-cathode fluorescent lamp (CCFL).

5. The LCD according to claim 4, wherein the CCFL has various fluorescent powder materials on an inner wall.

6. The LCD according to claim 5, wherein the fluorescent powder materials comprise red fluorescent powder, green fluorescent powder, and blue fluorescent powder.

7. The LCD according to claim 1, wherein the substrates comprise a thin film transistor (TFT) array substrate and a color filter substrate.

8. The LCD according to claim 1, wherein the substrates comprise a color filter on array (COA) substrate and an opposite substrate having a common electrode.

9. The LCD according to claim 1, wherein the substrates comprise an array on color filter (AOC) substrate and an opposite substrate having a common electrode.

10. An LCD, comprising:
    a backlight module having at least one white light source, wherein $BL_1$ and $BL_2$ respectively represent maximum brightness peaks of a normalized emission spectrum of the backlight module at a wavelength between 500 nm and 520 nm and between 445 nm and 465 nm, and $BL_1/BL_2 \leq 0.65$;
    a liquid crystal display panel disposed above the backlight module and having a plurality of substrates and a liquid crystal layer located between the substrates, wherein one of the substrates has a red filter layer, a green filter layer, and a blue filter layer, and the red filter layer, the green filter layer, and the blue filter layer satisfy the following relation expressions:

$R_x \geq 0.655$, $G_x \geq 0.275$, $B_y \leq 0.075$, wherein $R_x$ is defined as x coordinate value of the red filter layer in CIE 1931 chromaticity coordinate diagram under a C light source, $G_x$ is defined as x coordinate value of the green filter layer in CIE 1931 chromaticity coordinate diagram under the C light source, and $B_y$ is defined as y coordinate value of the blue filter layer in CIE 1931 chromaticity coordinate diagram under the C light source.

11. The LCD according to claim 10, wherein the backlight module comprises a direct-type backlight module or an edge-type backlight module.

12. The LCD according to claim 10, wherein the white light source comprises a white LED.

13. The LCD according to claim 10, wherein the white light source comprises a CCFL.

14. The LCD according to claim 13, wherein the CCFL has various fluorescent powder materials on an inner wall.

15. The LCD according to claim 14, wherein the fluorescent powder materials comprise red fluorescent powder, green fluorescent powder, and blue fluorescent powder.

16. The LCD according to claim 10, wherein the substrates comprise a TFT array substrate and a color filter substrate.

17. The LCD according to claim 10, wherein the substrates comprise a COA substrate and an opposite substrate having a common electrode.

18. The LCD according to claim 10, wherein the substrates comprise an AOC substrate and an opposite substrate having a common electrode.

* * * * *